United States Patent
Fernholz et al.

[19]

[11] Patent Number: 6,146,522
[45] Date of Patent: Nov. 14, 2000

[54] METHOD FOR CONTROLLING ODOR IN WASTE HANDLING SYSTEMS

[75] Inventors: Peter J. Fernholz, Burnsville; Keith L. Ware, White Bear Lake, both of Minn.

[73] Assignee: Ecolab Inc., St. Paul, Minn.

[21] Appl. No.: 09/082,098

[22] Filed: May 20, 1998

[51] Int. Cl.[7] .......................... B01D 21/30; B01D 35/00; E03D 9/10; C02F 9/04

[52] U.S. Cl. ...................... 210/143; 210/173; 210/195.1; 210/196; 210/209; 210/242.1; 210/258; 210/916

[58] Field of Search ................. 210/242.1, 173, 210/96.1, 743, 916, 206, 198.1, 143, 195.1, 196, 209, 258

[56] References Cited

U.S. PATENT DOCUMENTS

| | | | |
|---|---|---|---|
| 2,858,939 | 11/1958 | Corliss | 210/173 |
| 2,974,800 | 3/1961 | Fleischmann | 210/173 |
| 3,733,617 | 5/1973 | Bennett | 210/173 |
| 3,883,303 | 5/1975 | Roberts | 210/916 |
| 4,213,857 | 7/1980 | Ishida | 210/6 |
| 4,619,710 | 10/1986 | Kuenn et al. | . |
| 4,999,857 | 3/1991 | Mohrman | 4/111.1 |
| 5,013,442 | 5/1991 | Davis et al. | . |
| 5,094,752 | 3/1992 | Davis et al. | . |
| 5,336,398 | 8/1994 | Russell et al. | . |
| 5,374,356 | 12/1994 | Miller et al. | 210/641 |
| 5,520,803 | 5/1996 | Russell et al. | . |
| 5,833,864 | 11/1998 | Miller et al. | 210/724 |
| 5,928,514 | 7/1999 | Gothreaux | 210/617 |

Primary Examiner—Chester T. Barry
Attorney, Agent, or Firm—Merchant & Gould P.C.

[57] ABSTRACT

Odors can arise from an enclosed waste processing system designed to convert solid waste into an aqueous pulp and extract a solid phase and an aqueous phase from the waste. The odors are the result of anaerobic portions of the system in which anaerobic microorganisms convert waste including fatty soils into volatile odor components including low molecular weight carboxylic acids. The action of these microorganisms can be controlled by maintaining the pH, of the aqueous phase common to all portions of the system, at above a pre-selected alkaline pH. Such a pH can be maintained by dosing the aqueous phase in the system with an appropriate amount of one or more alkalinity sources on a timely basis.

16 Claims, 1 Drawing Sheet

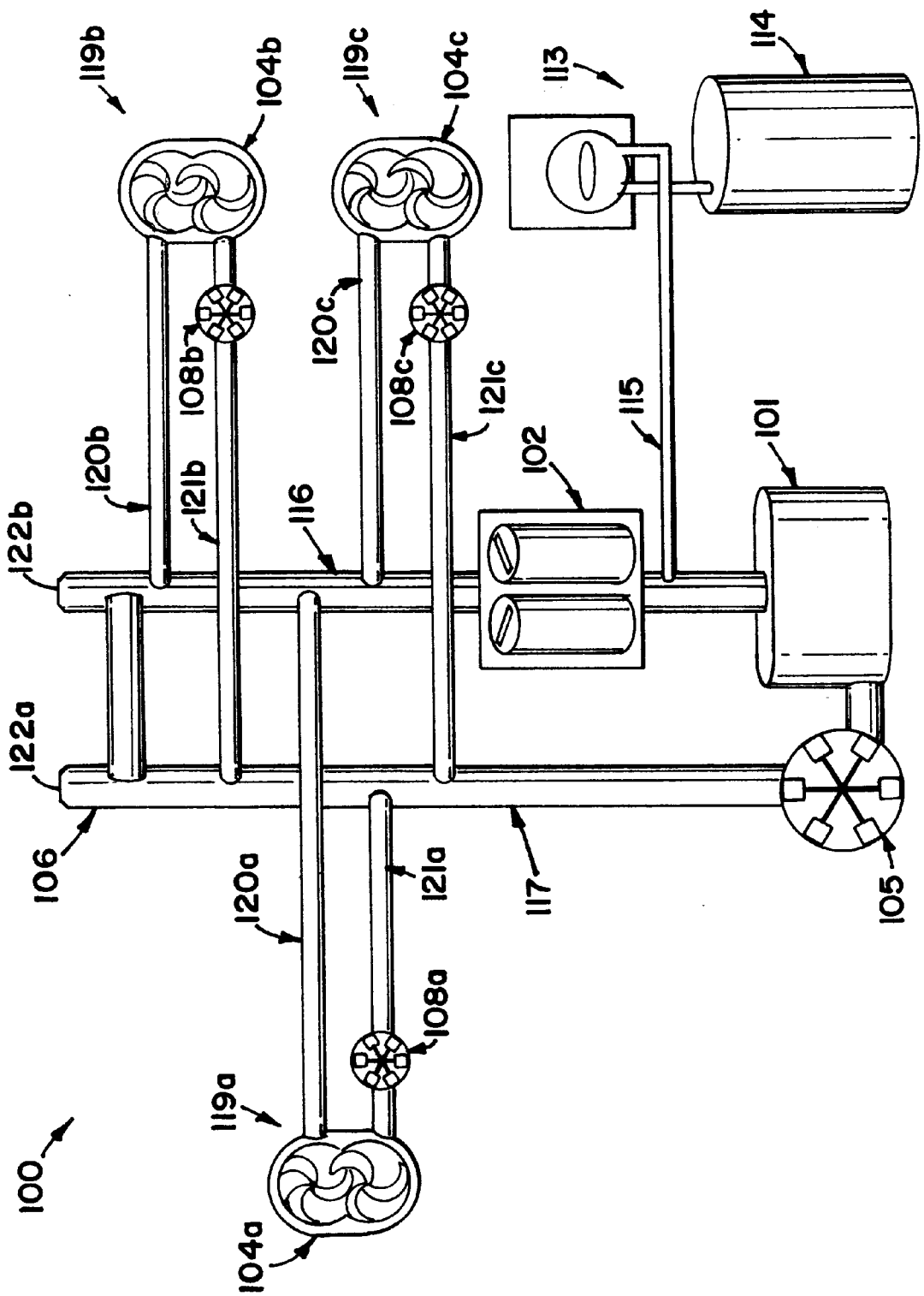

METHOD FOR CONTROLLING ODOR IN WASTE HANDLING SYSTEMS

FIELD OF THE INVENTION

The invention relates to controlling odor in an enclosed aqueous waste management system using a recirculating stream as a transport medium. Such systems are designed to accumulate waste in the transport stream, prepare a waste pulp and separate a solid product and an aqueous liquid product from the aqueous suspension of a waste pulp. The solid waste can then be incinerated or otherwise disposed conventionally. The enclosed system is operated under conditions that prevent the production of off odors arising from the biological action of anaerobic microorganisms on organic residues common in such systems. Specific systems include systems containing organic components in an aqueous stream such as a food waste system.

BACKGROUND OF THE INVENTION

Most industries face significant liquid/solid waste disposal problems. Such waste typically comprise a substantial solid phase containing an organic component that can be moved by or dispersed in a liquid substantially aqueous mobile phase. The aqueous mobile phase can be reused while the solids are continually separated. The solid phase can often contain a broad range of particle sizes and a large proportion of organic (e.g.) food related residues including carbohydrates, fats, proteins and other materials of biological origin. Of particular concern in the area of solid waste management is the production of strong or offensive smells or off-odors produced during operations of such waste handling systems.

One particularly sensitive area of solid waste management involves enclosed aqueous/solid waste handling systems having anaerobic sections. Such systems can include processing units such as waste pulpers or grinders (food disposals), pumps, lines, tanks, solids extractor components, etc. In such systems, waste is commonly obtained in the form of a slurry or dispersion of solid waste material in an aqueous liquid carrier or medium. Such waste is generated in that form or is converted to that form by equipment that grinds, pulps, shreds or otherwise reduces solids in the waste stream into a particle size that can be dispersed into a liquid carrier medium for transportation through the system. The slurry or dispersion of solid waste in the liquid medium is typically directed to a solids extractor or separator that, using a physical process, separates the waste into a solids portion containing a relatively smaller or reduced portion of the aqueous medium from a portion comprising the majority of the aqueous medium. The aqueous medium is then either reused, treated for other uses or discarded into municipal waste treatment systems. The solid waste with a minimal amount of water can then be directed to incinerator disposal, landfill disposal, or other appropriate disposal modes. In the anaerobic sections of the system, anaerobic microorganisms grow by utilizing soluble materials and waste solids as a source of energy and growth. Such activity can also result in odor generation.

Within the enclosed system, a collection of processing equipment is installed for the purpose of collecting the waste, adjusting the waste to the appropriate form in a pumpable system, directing the slurry or dispersion of aqueous waste to a solid extractor for removal of solids from the aqueous waste while the aqueous material is then maintained in a holding tank. The inherent nature of such enclosed systems results in a proportion of the system that is maintained under substantially anaerobic, substantially oxygen reduced, conditions. Under such conditions, in the presence of food waste including fatty, carbohydrate and proteinaceous soils, the growth of substantial proportions of anaerobic microorganisms can be promoted. The anaerobic microorganisms use the food waste as a source of energy and produce as a result of their microbial activity, off-odors resulting from nitrogen metabolism, carbon metabolism, sulfur metabolism or other microbial action. One particularly offensive odor results from the production of relatively small $C_{2-6}$ carboxylic acids that have a characteristic "vomitus" anaerobic odor. The odors can be detected during careless operations and when small leaks arise from acid promoted corrosion.

The prior art shows three methods of controlling the production of off odors. The first method involves the careful operation of such systems such that the microorganism growth is prevented by careful operation including flushing the system with water with sufficient frequency to purge the system of substantial numbers of microorganisms. A second useful control mechanism involves the introduction of pleasant masking odors into the system to mask the off odors when released into the close by environment. A third useful control mechanism involves the introduction of competing microorganisms into the system to replace the odor generating microbes with a population that has reduced quantity of odor or odors of a reduced offensive nature.

Such anaerobic enclosed systems are particularly difficult to deal with in hospitality installations having a high degree of soil load containing a large proportion of food derived waste. Such systems are common in hospitality locations serving relatively large populations in relatively small locations such as hospitals, hotels and cruise ships. In these environments, the production of off odors is particularly problematic due to the closeness of large numbers of sensitive individuals to the source of the odor and the intensity of the generated odors.

A mobile waste treatment facility is shown in the prior art. Russell et al., U.S. Pat. Nos. 5,336,398 and 5,520,803 disclose an aerobic portable waste water treatment device open to the ambient atmosphere that is adapted to treatment of industrial waste water. One specific waste stream is generated by marine cargo container cleaning or wash out operations. In such operations, marine cargo containers are cleaned in port and the resulting waste water is treated and disposed. The Russell et al. treatment process uses an oxidizing agent in a first reactor tank. The resulting treated composition is neutralized to a pH between 7.5 and 9.4 in order to precipitate heavy metals from the material. The supernatant is pumped through a filter to yield a waste water that can be disposed or reused. The precipitate sludge is accumulated, thickened, dewatered and disposed in a landfill. The system in Russell et al. is largely aerobic, uses an oxidizing agent, contains minimal organic wastes and is not used in areas sensitive to odor production.

Accordingly, a substantial need remains to obtain an organic waste handling system that can be operated without the production of offensive odors.

BRIEF DISCUSSION OF THE INVENTION

The invention relates to an enclosed, at least partly anaerobic waste processing system that can produce and handle a pulp waste with minimal odor production. In at least some embodiments, at least a portion of the system is aerobic. The system forms a pulp waste by comminuting a range of waste particulates into an aqueous pulp. This system is operated at conditions of pH minimizing odor production throughout the system. The anaerobic microbes lose the ability to metabolize and grow if the aqueous phase is at a sufficiently alkaline pH. The output of the system derived from the treated pulp comprises a solid dewatered waste product and an aqueous waste.

The system comprises at least one holding tank containing a mobile aqueous phase. The aqueous phase is circulated through a collection or accumulating main and then throughout the processing system. The mobile phase transports pulp waste from waste pulpers in the system to the accumulation main to a solid product extractor. The solid product extractor removes the solids from the liquid pulped waste producing a dewatered solid output and a liquid aqueous output. The solid waste product is directed to a holding bin for incineration or landfill disposal. The liquid waste is directed to the holding tank for combination with the mobile phase.

The system contains preferably one or more solid waste pulpers that is in liquid communication with a recirculation system in liquid communication with the accumulation main. The recirculation system is operated using two or more pumps that ensure that the mobile phase efficiently transports solid waste from the solid waste pulpers to the main to the solid product extractor. The operation of the pumps, tanks, lines and other active components of the system is controlled by a controller that ensures the active operation of the system.

The term "controller" can have several different meanings. In general the controller adds sufficient alkaline material to maintain the pH at an anti-microbial or inhibitory level. In a preferred embodiment, the treatment chemicals are added on a timed-feed basis which is initiated when the gray water is replenished. In this case, a predetermined amount of one or more alkalinity sources is added in sufficient quantity to adjust the pH to a level that will remain sufficiently alkaline until the aqueous medium is replaced. In this instance, the controller comprises a water supply solenoid and a means to add the alkalinity source to the aqueous medium. In an alternative embodiment, the waste treatment system comprises one or more pH or conductivity sensors. This would permit on-the-fly corrections to the pH of the aqueous waste solution. However, it is difficult to obtain accurate pH readings due to the size of the system and the resultant lack of homogeneity. In this instance, the controller would comprise the pH or conductivity sensors, a means to dispense the alkalinity source and electronic means to read the sensors and control the dispensing means.

The system is characterized by at least a portion of the waste handling elements that are inherently anaerobic. In the anaerobic portions of the system, anaerobic bacteria can grow and under certain conditions produce off odors that can be offensive to operating personnel and others in close proximity thereto. We have found that the off odors arise from the anaerobic bacteria in the system. The microbial populations producing the off-odors can be controlled through pH control. We have found that maintaining the pH of the mobile phase at an alkaline pH greater than 10, preferably greater than 11, results in a substantial cessation of metabolism and an associated reduction of the off odor production activity of the anaerobic bacteria. Odors that can arise from carbon metabolism, sulfur metabolism, nitrogen metabolism, or carboxylic acid metabolism can be substantially reduced by alkaline pH control.

In a preferred mode, the enclosed mobile waste handling system of the invention is installed aboard a large passenger vessel capable of ocean voyage. The system contains one or more waste pulpers. Each waste pulper is installed in a food handling area aboard the vessel. Such vessels have multiple food processing areas in restaurants, bars, buffet areas, theaters, lounges, etc., each food preparation having a waste pulper, an associated pump and aqueous recirculation line. The output of the pulper and pump is directed to an accumulating main which directs the pulper output into the solids extractor and surge tank (see the Figure). Overall, the system maintains a continuous circulation of the mobile aqueous phase which obtains the food pulp from the pulpers and moves the food pulp into the solid extractor component for removal of the solids while the aqueous mobile phase is returned to the surge tank. The overall system can have a variety of embodiments with waste pulpers, two or more recirculating lines connecting the pulpers, the recirculating lines then in liquid communication with an accumulating main. In this context the term "gray water" refers to the mobile aqueous phase in the ship board waste treatment system.

For the purpose of this patent application, the term "pulper" or "waste pulper" refers to a mechanical device, (e.g.) a sink mounted garbage disposal in an institutional scale, that can convert solid waste of varying particle size and shape to a waste pulp of uniform reduced particle size. The particle size of the reduced waste is easily dispersed in the mobile aqueous phase. One embodiment of such a solid waste pulper is a common institutional sink disposal or a conventional restaurant food waste pulping system. For the purpose of this patent application, the term "mobile phase" refers to a largely aqueous phase that is pumped throughout the accumulating main, recirculation system and waste lines associated with the solid waste pulpers. The mobile phase fills the system and is maintained in sufficient volume and flow rates to ensure that solid waste generated by the waste pulpers are efficiently transported from the pulpers into the waste lines and then into any accumulating main for processing in the solids extractor. The mobile phase typically circulates through a surge tank into the mains for accumulation of solid waste. The volume of the surge tank is maintained by adding fresh makeup water and draining water when appropriate. The mobile phase, which is periodically dumped and replaced by fresh water, must be adjusted in pH when replaced.

The overall system is adapted to convert solid waste of virtually any source into a solid waste component that can be carried by the mobile phase throughout the system. For the purpose of this patent application, the term "liquid waste" refers to the output of the solids extractor which separates the solid waste product from the liquid resulting from the accumulating main. The term "pulp" refers to the solid waste in the form of a reduced particle size material produced by the pulper.

BRIEF DESCRIPTION OF THE DRAWING

The FIGURE shows one embodiment of the solid waste handling system of the invention. The solid food waste handling system is adapted for installation aboard a passenger vessel capable of ocean voyage. The food waste handling system has food pulpers installed in separate recirculating lines. Each recirculating line is in liquid communication with an accumulating main. The accumulating main receives flow of pulped waste from the waste pulpers and directs the waste to a solids extractor which produces a solid product and a liquid product from the solids dispersed in the liquid. The liquid product is accumulated in a surge tank which uses the liquid as a mobile phase for accumulating solid pulp from the system. The aqueous phase of the system is maintained in an alkaline pH that suppresses the action of anaerobic microorganisms that produce undesirable odors at pH's less than 7.

DETAILED DESCRIPTION OF THE INVENTION

The invention relates to a solid waste handling system using a mobile aqueous phase that transports a solid waste pulp from a source of the pulp to a solids extractor. The mobile aqueous phase is operated under conditions that maintains the pH of the mobile phase at greater than pH 10, preferably greater than pH 10.5, resulting in the suppression of off odors resulting from the biological action of anaerobic bacteria that can inhabit areas of the system that are inherently anaerobic. We have found that certain anaerobic bacteria that are present in the environment, can begin to grow and multiply in the presence of organic materials, can reduce the pH of the bacterial surroundings to an acid pH and can then begin to produce off odors. Such off odors can result from a the metabolism of variety of organic sources resulting in off sulfur odors, off nitrogen odors and in particular can produce a "vomitus" odor resulting from fatty acid metabolism producing small molecule fatty acids such as acetic acid, butyric acid, propionic acid, and other $C_{2-6}$ aliphatic carboxylic acids.

Such odors are most commonly produced in solid food waste handling systems which handle large volumes of food waste having large proportions of fats and oils in the solid component. Such food waste handling systems are most common in hospitality areas such as those found in hospitals, hotels, cruise ships and other areas in which a solid waste handling system is used comprising a mobile aqueous phase that acts to transport the product of a food pulper to a solids extractor system.

Treatment of Aqueous Phase

The aqueous treatments of the invention may comprise an alkaline solution or alkaline buffer system that has sufficient pH modification or buffering capacity to maintain the mobile aqueous phase used by the solid waste handling system at an alkaline pH. The alkaline pH can be maintained by a source of alkalinity and can comprise other buffering or water treating components. Sources of alkalinity common in such systems include common alkaline bases such as alkali metal carbonates, alkali metal silicates, alkali metal hydroxides, and other aqueous soluble bases. The materials can be added as either a liquid, solid or a powder. The treatment can also contain other components that can aid in obtaining a positive interaction between the buffer and the waste system components including materials such as nonionic surfactants or wetting agents, sequestrants, metal protectors or anti corrosion agents, dyes, perfumes, etc.

Aqueous compositions useful for maintaining alkaline pH in the aqueous multiple phase of the waste handling system of the invention can be simple solutions of an aqueous base or more complex mixtures of a buffer solution containing active additive materials. The pH of the mobile aqueous phase of the system can be maintained at an alkaline pH simply by metering into the system at any convenient time, a volume of an aqueous base material. Such materials include alkali metal hydroxides, ammonium hydroxide, alkali metal silicates including alkali metasilicate, orthosilicate, complex silicates, etc.; alkali metal carbonate. Such materials can be made up into a concentrate comprising about 10 to 60 wt % base in an aqueous medium, preferably soft water. Since strong base can also contribute to corrosion, the concentration of the aqueous base is controlled to prevent broad or large swings of pH in the aqueous medium. Silicates can be used to help protect mild steel, and soft metal system components.

The material can be a simple solution or a buffer material selected to maintain the pH of the aqueous medium at a selected range of buffers. Known buffers can be selected for such pH control. Highly alkaline pH buffers can be made using disodium phosphate sodium hydroxide buffers. Selection and preparation of such buffers are well within the skill of the ordinary artisan to select a target pH and a buffer mixture for use. Such aqueous pH adjustment or control materials can include other additives other than those responsible for pH change.

Additives can include hardness sequestering agents that prevent the interference between hardness ions such as calcium, magnesium, iron, manganese, etc. with the action of the active materials in the pH modifying system. Such sequestrants can include inorganic sequestrants such as sodium tripolyphosphate and organic sequestrants such as organophosphonate sequestrants, NTA, polyacrylic acid sequestrants, etc. The compositions can also contain anti-corrosion additives such as chromate, nitrite, silicate, borate inhibitors. Organic inhibitor compounds include aniline, pyridine, benzoic acid, nitrogen or sulfur heterocycles benzotriazole and butylamine and others. Further, the system can include compositions that tend to plate out from the system onto metal surfaces to inhibit corrosion. Lastly, the aqueous systems of the invention can include compositions that can clean and lubricate pumps, pulpers, valves, tanks and lines in the waste handling system. A variety of other additives can also be contemplated for use in the systems including dyes, odor masking perfumes and other convention additive materials.

One particularly useful pH treatment solution of the invention is found below in Table I. Typically, this solution would be used at a concentration of 1.5 to 2.0 grams per liter of water.

TABLE 1

Metal Protecting Liquid pH Adjustment Composition

| | PERCENT | RAW MATERIAL |
|---|---|---|
| | 40.6 | Soft water |
| | 3.6 | N-octanyl succinic anhydride |
| | 0.6 | Nonionic Surfactant |
| | 19.8 | Sodium hydroxide (50% aqueous active) |
| | 10.0 | Organophosphate (Dequest 2000) |
| | 5.0 | Polyacrylic sequestrant |
| | 20.4 | $Na_2O:SiO_2$ composition |
| TOTAL: | 100.0 | |

Alkaline materials such as that shown in Table 1 can be added to an enclosed waste management system as described in this application in a variety of ways. The aqueous phase of the waste system can be continually monitored for pH and the alkaline material can be added to the waste system whenever the pH is reduced to a set point that triggers the addition of alkaline material. Alternately, the system can be adapted to add alkaline material periodically, based on the known nature and performance of the waste handling system such that the pH of the system remains greater than 10, preferably greater than 11.

Common waste management systems used aboard ship contain approximately 500 to 10,000 liters of aqueous phase in the accumulating mains and transport conduits moving solids in the aqueous phase to the solid extractor component. Since the system can contain a substantial quantity of microorganisms operating under anaerobic conditions, the pH of the material can quickly become acidic and reach a pH between 2 and 5 within a few hours to a few days of operation. The invention comprises a means to add a sufficient amount of one or more alkalinity sources that can maintain a highly alkaline pH within the waste management system. Such high pH serves to inhibit growth of anaerobic microorganisms. Several variations of the preferred embodiment are possible. One possibility is to add a sufficient amount of one or more alkalinity sources each time the gray water is replaced with fresh water. In such operations, the entire volume of gray water is replaced with fresh water obtained from the ships-stores or from the shore-based support facilities. Gray water replacement typically occurs each time the ship makes port, or more frequently at sea. Before the gray water is discarded the food solid and other solids are substantially removed leaving minimal solids in suspension. The pH of the system can be monitored to maintain pH during operations.

A preferred embodiment includes means to add one or more alkalinity sources once (i.e.) each time the gray water in the waste management system is replaced. In this mode the amount added is sufficient to maintain pH during operations.

A second preferred embodiment includes means to add one or more alkalinity sources each time the gray water in the waste management system is replenished with fresh-feed water or make up water is added. In this instance, a complete gray water replacement is not required. This embodiment has the advantage of being more reactive to changes in the waste solutions.

Another embodiment would involve a controller which would dispense a predetermined amount of one or more alkalinity sources on a timed basis, independent of gray water replenishment. This would assume that an average waste volume could be determined.

An alternative embodiment involves the use of pH or conductivity sensors to continually monitor the pH level of the aqueous waste phase. While this embodiment has the advantage of responding almost instantaneously to pH changes, it has the distinct disadvantage that, due to the large size of the waste system, obtaining accurate pH or conductivity ratings could be difficult.

In each of these embodiments, the term "controller" is used to define conventional means for adding the alkalinity source or sources and means for controlling when the alkalinity source is added and how much is added.

DETAILED DISCUSSION OF THE DRAWING

The FIGURE is an illustration of the waste handling system 100 adapted to handling food waste. In the system, a surge tank 101 and a solid extractor 102 is installed on an accumalating main system 106 having an accumalating main 116 that directs the mobile phase and food pulp to the solids extractor 102. The extractor 102 produces a solid product sent to storage. The accumulating main system comprises an accumulating main 117 that directs a mobile phase from the surge tank through pump 105 into the system. The mobile phase then returns to the solid extractor 102 and the surge tank 101 through accumalating main 116. In liquid communication with the accumalating main system 106 are one, two or more recirculating systems 119a,119b, etc. The recirculating system comprises a recirculating main 120a, 120b, 120c, etc. which directs the mobile aqueous phase and pulp solids to the accumulating main 116. Mobile aqueous phase from main 117 is directed through lines 121a, 121b, 121c to pumps 108a, 108b, 108c that are in liquid communication with pulpers 104a, 104b, 104c which convert food waste into a waste pulp which is then combined with the aqueous phase and directed to the accumulating main 116.

The system additionally contains dosing system 113 which directs a stream of the treatment liquid from a container or source 114 through a treatment line 115 into the system 100. The treatment stream can also be directed into the accumulating main system 106, the solids extractor 102 or the recirculation systems 119a, 119b, etc. Preferably, however, the treatment liquid is added at the solids extractor 102. The accumalating mains 116 and 117 can be vented at vents 122a or 22b to obtain proper flow of materials during operations.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An enclosed food waste processing system for handling a pulped food waste that produces a solid food waste product and an aqueous waste product from the pulped food waste, the processing system comprising:
    (a) a holding tank containing at least a mobile aqueous phase that is circulated throughout the processing system;
    (b) a solid food product extractor having an aqueous waste product outlet in liquid communication with the holding tank;
    (c) at least one food waste pulper in liquid communication with the solid product extractor, the waste pulper having an input in liquid communication with an outlet of the holding tank;
    (d) a controller; and
    (e) a source of an alkaline aqueous treatment which, when directed by the controller, is capable of directing sufficient aqueous alkaline treatment into a structure in the processing system selected from the group consisting of the extractor, an accumulating main system, and a recirculating system in liquid communication with an accumulating system to maintain the pH of the aqueous phase at greater than 10; wherein at least a portion of the enclosed system is anaerobic.

2. The processing system of claim 1 wherein the processing system is installed aboard a vessel capable of ocean navigation.

3. The processing system of claim 1 wherein the processing system comprises two or more waste pulpers.

4. The processing system of claim 1 wherein the holding tank has a capacity of greater than 1000 liters.

5. The processing system of claim 1 wherein the aqueous alkaline treatment is directed into the solids extractor.

6. The processing system of claim 1 wherein the pH of the aqueous phase is greater than 10.5.

7. The processing system of claim 1 wherein the aqueous treatment comprises a nonionic surfactant.

8. An enclosed food waste processing system for handling a pulped food waste that produces a solid food waste product and an aqueous waste product from the pulped food waste, the processing system comprising:
    (a) a holding tank containing at least an aqueous phase comprising a mobile aqueous phase that is circulated throughout the processing system, the tank installed in an accumulating main system having an accumulating main system pump which pumps water from the tank through the accumulating main system and back to the tank;

(b) a solid food product extractor installed in the accumulating main system, the outlet of the extractor in fluid communication with the holding tank;

(c) at least one recirculating system having a recirculating line and a food waste pulper in liquid communication with the recirculating line, the recirculating system having a recirculating system pump promoting movement of said water through the recirculating system, the recirculating line in liquid communication with the accumulating main system;

(d) a controller; and (e) a source of an alkaline aqueous treatment which is in liquid communication with the accumulating main system and, when directed by the controller, is capable of directing sufficient aqueous alkaline treatment into a structure in the processing system selected from the group consisting of the extractor, the accumulating main system, and the at least one recirculating system to maintain the pH of the aqueous phase at greater than 10; wherein at least a portion of the processing system is anaerobic.

9. The processing system of claim 8 wherein the at least one recirculating system comprises more than one food waste pulper.

10. The processing system of claim 8 wherein the pH of the aqueous phase is greater than 10.5.

11. The processing system of claim 8 wherein the processing system is installed aboard a vessel capable of ocean navigation.

12. The processing system of claim 8 wherein the processing system comprises two or more waste pulpers.

13. The processing system of claim 8 wherein the holding tank has a capacity of greater than 1000 liters.

14. The processing system of claim 8 wherein the aqueous alkaline treatment is directed into the solids extractor.

15. The processing system of claim 8 wherein the pH of the aqueous phase is greater than 11.

16. The processing system of claim 8 wherein the aqueous treatment comprises a nonionic surfactant.

* * * * *